(12) United States Patent
Yang

(10) Patent No.: US 7,498,788 B2
(45) Date of Patent: *Mar. 3, 2009

(54) SWITCHING REGULATOR HAVING ENERGY SAVING CIRCUIT

(75) Inventor: Ta-Yung Yang, Milpitas, CA (US)

(73) Assignee: System General Corp., Taipei (TW)

( * ) Notice: Subject to any disclaimer, the term of this patent is extended or adjusted under 35 U.S.C. 154(b) by 152 days.

This patent is subject to a terminal disclaimer.

(21) Appl. No.: 11/255,961

(22) Filed: Oct. 24, 2005

(65) Prior Publication Data

US 2007/0090816 A1 Apr. 26, 2007

(51) Int. Cl.
*G05F 1/00* (2006.01)
(52) U.S. Cl. ...................................... 323/283
(58) Field of Classification Search ................. 323/282, 323/284, 288, 271, 283
See application file for complete search history.

(56) References Cited

U.S. PATENT DOCUMENTS

| | | | | |
|---|---|---|---|---|
| 6,046,896 | A * | 4/2000 | Saeki et al. ..................... | 361/86 |
| 6,396,252 | B1 * | 5/2002 | Culpepper et al. ........... | 323/285 |
| 6,605,930 | B2 * | 8/2003 | Hwang ........................ | 323/225 |
| 6,724,174 | B1 * | 4/2004 | Esteves et al. ............... | 323/224 |
| 6,861,830 | B1 * | 3/2005 | Tzeng et al. ................. | 323/284 |
| 2005/0007088 | A1 * | 1/2005 | Yang et al. ................... | 323/283 |
| 2005/0017702 | A1 * | 1/2005 | Kernahan et al. ............ | 323/282 |
| 2005/0116697 | A1 * | 6/2005 | Matsuo et al. ............... | 323/282 |
| 2006/0055433 | A1 * | 3/2006 | Yang et al. ..................... | 327/10 |
| 2007/0080672 | A1 * | 4/2007 | Yang ............................ | 323/282 |

\* cited by examiner

*Primary Examiner*—Shawn Riley
(74) *Attorney, Agent, or Firm*—Bacon & Thomas, PLLC

(57) ABSTRACT

A switching regulator having an energy saving circuit and an energy saving method is provided to improve the system efficiency under light load conditions. A first control unit outputs an oscillation signal and an energy saving signal in response to the variation of a feedback signal. A second control unit receives the feedback signal and the oscillation signal to output a switching signal to control a switch. An off-time of the switching signal is increased in response to a decrement of the load. The energy saving signal is applied to turn off the switch and the circuits of the switching regulator needn't to work during the off-time of the switching signal for saving energy under light load conditions.

6 Claims, 8 Drawing Sheets

US 7,498,788 B2

SWITCHING REGULATOR HAVING ENERGY SAVING CIRCUIT

FIELD OF THE INVENTION

The present invention relates to energy saving switching regulators, power supplies and power converters.

DESCRIPTION OF RELATED ART

A switching regulator is used to control a switching signal and provide a regulated voltage and current output. For energy saving requirements, the power utilization in the electronic products have been required to meet the power management and energy conservation regulation.

FIG. 1 shows a known switching regulator, in which a switch $Q_1$ is coupled to an input voltage $V_{IN}$ of the switching regulator. The switch $Q_1$ delivers the power to generate an output voltage $V_O$ through a magnetic component $T_1$. An auxiliary switch $Q_2$ is used to provide synchronous rectifying or half-bridge switching structure. The auxiliary switch $Q_2$ can be selected to be enabled or disabled. A coupler 50, such as an auxiliary winding of a transformer, an optical coupler or resistors, is coupled from the output voltage $V_O$ of the switching regulator to a control circuit 10 for providing an output signal $V_{FB}$. The control circuit 10 is coupled to a coupler 50 for receiving the output signal $V_{FB}$ and outputting a switching signal $S_{W1}$ and an auxiliary switching signal $S_{W2}$. The auxiliary switching signal $S_{W2}$ can be selected to be enabled or disabled. The switching signal $S_{W1}$ is used to turn on/off the switch $Q_1$ to obtain a stable regulated output voltage $V_O$ of the switching regulator. The auxiliary switching signal $S_{W2}$ is used to control the auxiliary switch $Q_2$.

Major losses in a switching regulator are core loss of the magnetic component $T_1$ and switching loss of the switch $Q_1$. Concerning the loss of the switching regulator under light load conditions, the major losses are in direct proportion to a switching frequency $F_S$ of the switching signal $S_{W1}$. Besides, another loss of the switching regulator is resulted from the power consumption of the control unit 10. A switching period Ts of the switching signal $S_{W1}$ is the reciprocal of the switching frequency $F_S$, which can be expressed as:

$$T_S = 1/F_S = T_{ON} + T_{OFF} \quad (1)$$

Where $T_{ON}$ and $T_{OFF}$ are respectively an on-time and an off-time of the switching signal $S_{w1}$. Increasing the switching period Ts reduces the power losses. However the switching regulator must operate in a short switching period Ts in order to shrink the size of the magnetic component $T_1$, the switching frequency Fs must be thus properly limited. To prevent the saturation of the magnetic component $T_1$, a maximum of the on-time $T_{ON}$ shall be limited. Therefore, the switching period Ts of the switching signal $S_{W1}$ can be expanded by increasing the off-time $T_{OFF}$ under light load and no load conditions. The power consumption of the switching regulator is thus reduced. However, when the switching frequency $F_S$ falls into the audio band, acoustic noise might occurs.

SUMMARY OF THE INVENTION

An object of the invention is to provide a switching regulator, a power supply and a power converter, in which parts of circuits are turned off under light load and no load conditions, for achieving energy saving and improving system efficiency.

A switching regulator includes a switch to control power delivering to an output of the switching regulator. A feedback unit outputs a feedback signal in response to load conditions. In order to save energy and improve the efficiency of the switching regulator under light load conditions, a first control unit outputs an oscillation signal and an energy saving signal in response to the variation of the feedback signal. A second control unit receives the feedback signal and the oscillation signal, for outputting a switching signal to control the switch. An off-time of the switching signal increases in response to a decrement of the load. The energy saving signal is applied to turn off the circuits of the switching regulator needn't to work during the off-time of the switching signal for saving power under light load conditions. For avoiding acoustic noises, the switching signal is disabled before a switching frequency of the switching signal falls into an audio band. The switching signal is enabled by the feedback signal when the load increases and the switching frequency of the switching signal is higher than the audio band. The present invention suggests a switching regulator having energy saving circuits for achieving energy saving and optimizing the power loss under light load and no load condition and for reducing acoustic noises of the switching regulator.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
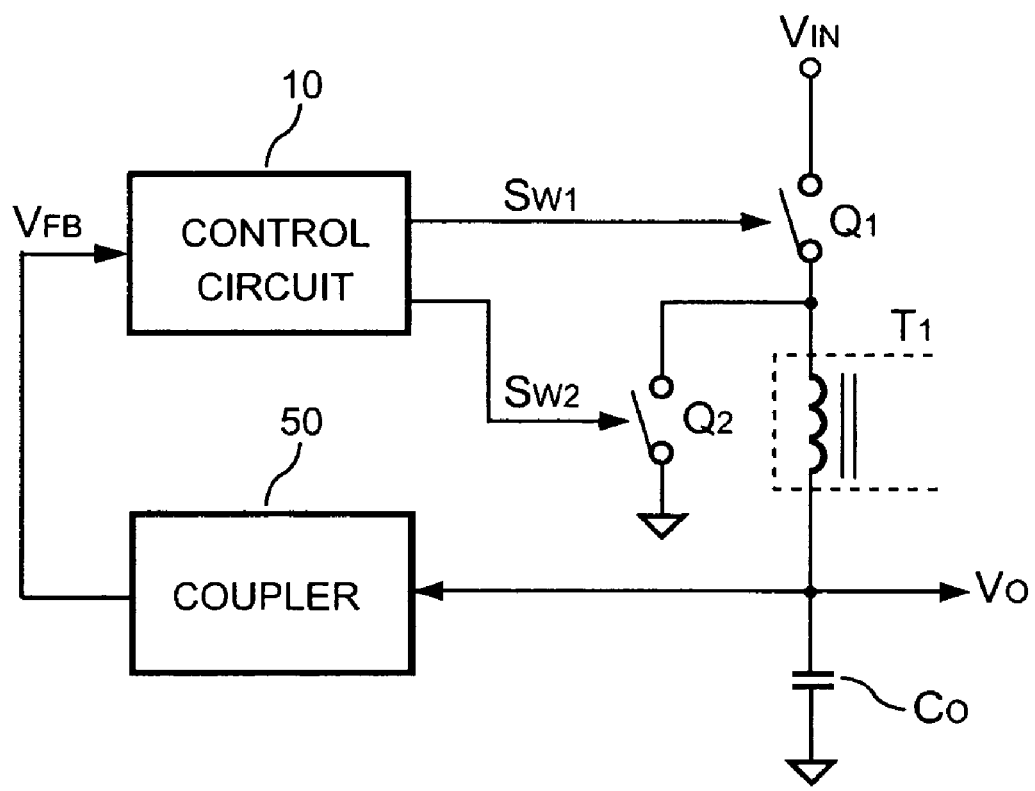
FIG. 1 shows a known switching regulator.
Figure 2:
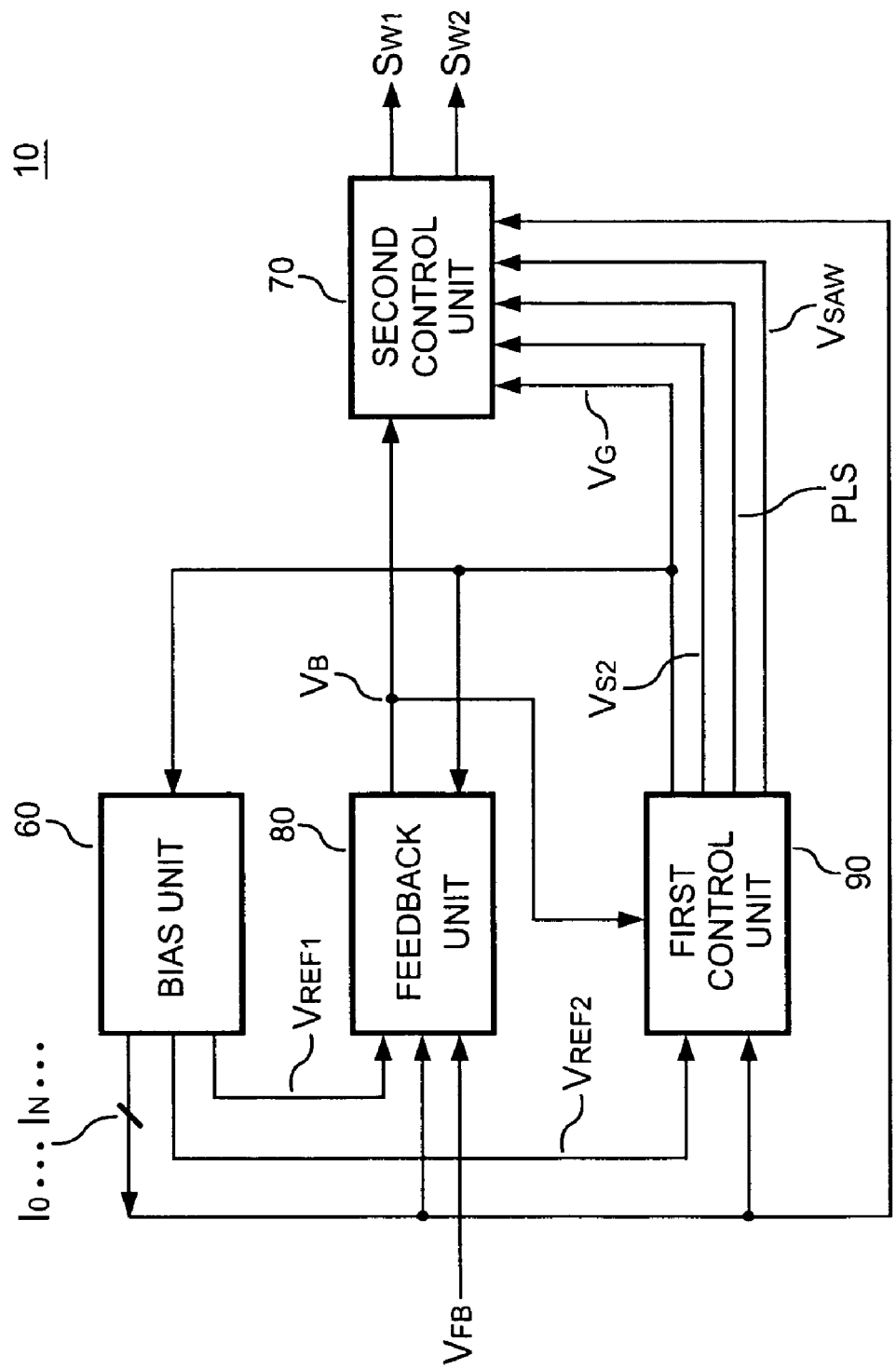
FIG. 2 shows a schematic diagram of a control circuit of the switching regulator according to the present invention.

FIG. 2 shows the schematic diagram of a control unit 10 of the switching regulator according to the present invention. A bias unit 60 produces a first reference voltage $V_{REF1}$, a second reference voltage $V_{REF2}$, and bias currents $I_0 \ldots I_N \ldots$ In combination with FIG. 1, a feedback unit 80 is coupled to an output voltage $V_O$ of the switching regulator through the coupler 50 for receiving an outputting signal $V_{FB}$ and generating a feedback signal $V_B$ in response to the output load conditions. A first control unit 90 receives the second reference voltage $V_{REF2}$ and the feedback signal $V_B$ for outputting an oscillation signal PLS, a saw-tooth signal $V_{SAW}$, an energy saving signal $V_G$, and an auxiliary control signal $V_{S2}$. A second control unit 70 outputs a switching signal $S_{W1}$ and an auxiliary switching signal $S_{W2}$ in response to the feedback signal $V_B$, the saw-tooth signal $V_{SAW}$, the auxiliary control signal $V_{S2}$, the energy saving signal $V_G$, and the oscillation signal PLS to control a switch $Q_1$ and an auxiliary switch $Q_2$. The switch $Q_1$ is coupled to the input voltage $V_{IN}$ of the switching regulator to control the power delivery for generating an output voltage $V_O$ at an output of the switching regulator.

An off-time $T_{OFF}$ of the switching signal $S_{W1}$ increases in response to a decrement of the load. The energy saving signal $V_G$ is applied to turn off the circuits of the switching regulator not operating during the off-time $T_{OFF}$ of the switching signal $S_{W1}$ for saving power under light load and no load conditions. That is, under light load and no load conditions, many circuits in the switching regulator are in standby state and need not to work. When the off-time $T_{OFF}$ increases to a certain extent, the switching regulator of the present invention will cut off the power for some circuits which need not to work for meeting the power management and energy conservation regulation and achieving energy saving. When the load decreases, the switching signal $S_{W1}$ is disabled before the switching frequency Fs falls into the audio band to avoid the acoustic noise. The switching signal $S_{W1}$ is enabled by the feedback signal $V_B$ when the load increases and the switching frequency is higher than the audio band. The auxiliary control signal $V_{S2}$ is used for turning off the auxiliary switch $Q_2$ once the off-time $T_{OFF}$ of the switching signal $S_{W1}$ is increased in response to the decrement of the load.

Figure 3:
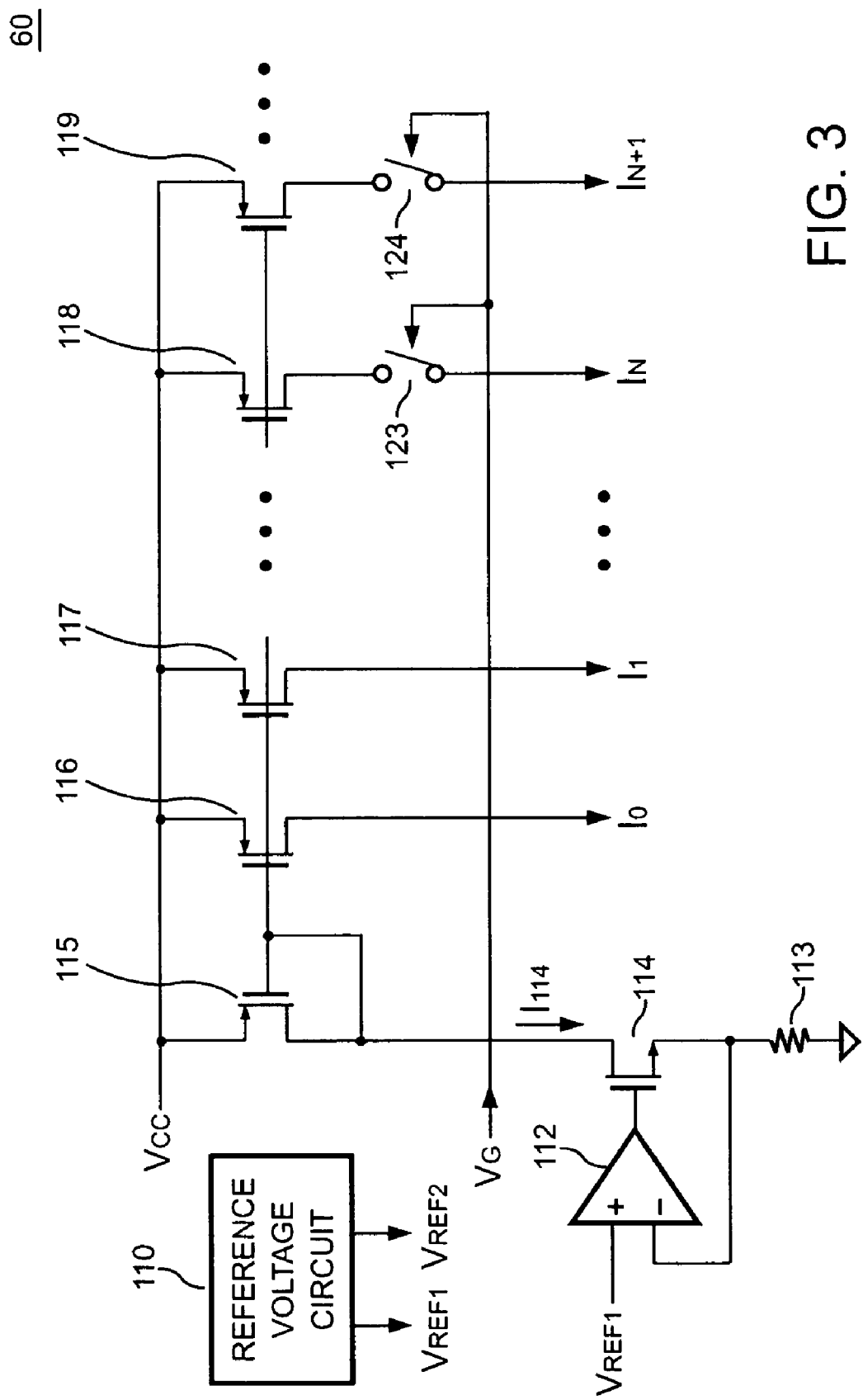
FIG. 3 illustrates an embodiment of a bias unit according to the present invention shown in FIG. 2.

In combination with FIG. 2, FIG. 3 illustrates an embodiment of the bias unit 60 according to the present invention. The bias unit 60 produces a first reference voltage $V_{REF1}$, a second reference voltage $V_{REF2}$, and bias currents $I_0 \ldots I_N \ldots$. A reference voltage circuit 110 generates the first reference voltage $V_{REF1}$ and the second reference voltage $V_{REF2}$. The first reference voltage $V_{REF1}$ is coupled to a first V-to-I converter, formed by an operational amplifier 112, a resistor 113, and a transistor 114. The first V-to-I converter receives the first reference voltage $V_{REF1}$ to output a constant current $I_{114}$. A first current mirror circuit formed by transistor 115, 116, 117, 118, 119, etc. The first current mirror circuit receives the constant current $I_{114}$ to output the bias currents $I_0 \ldots I_N \ldots$. The first current mirror circuit is provided to supply the power to the circuits of the switching regulator. Bias currents $I_0, I_1 \ldots$ are coupled to circuits which always need to work under various loads, and bias currents $I_N, I_{N+1} \ldots$ are coupled to circuits that need not to work under light load and no load conditions. Switches 123 and 124 turns on/off the bias currents $I_N, I_{N+1} \ldots$ for energy saving. Switches 123 and 124 are controlled by the energy saving signal $V_G$. Therefore the energy saving signal $V_G$ is low under light load and no load conditions, which turns off the circuits of the switching regulator not operating under light load and no load conditions.

Figure 4:
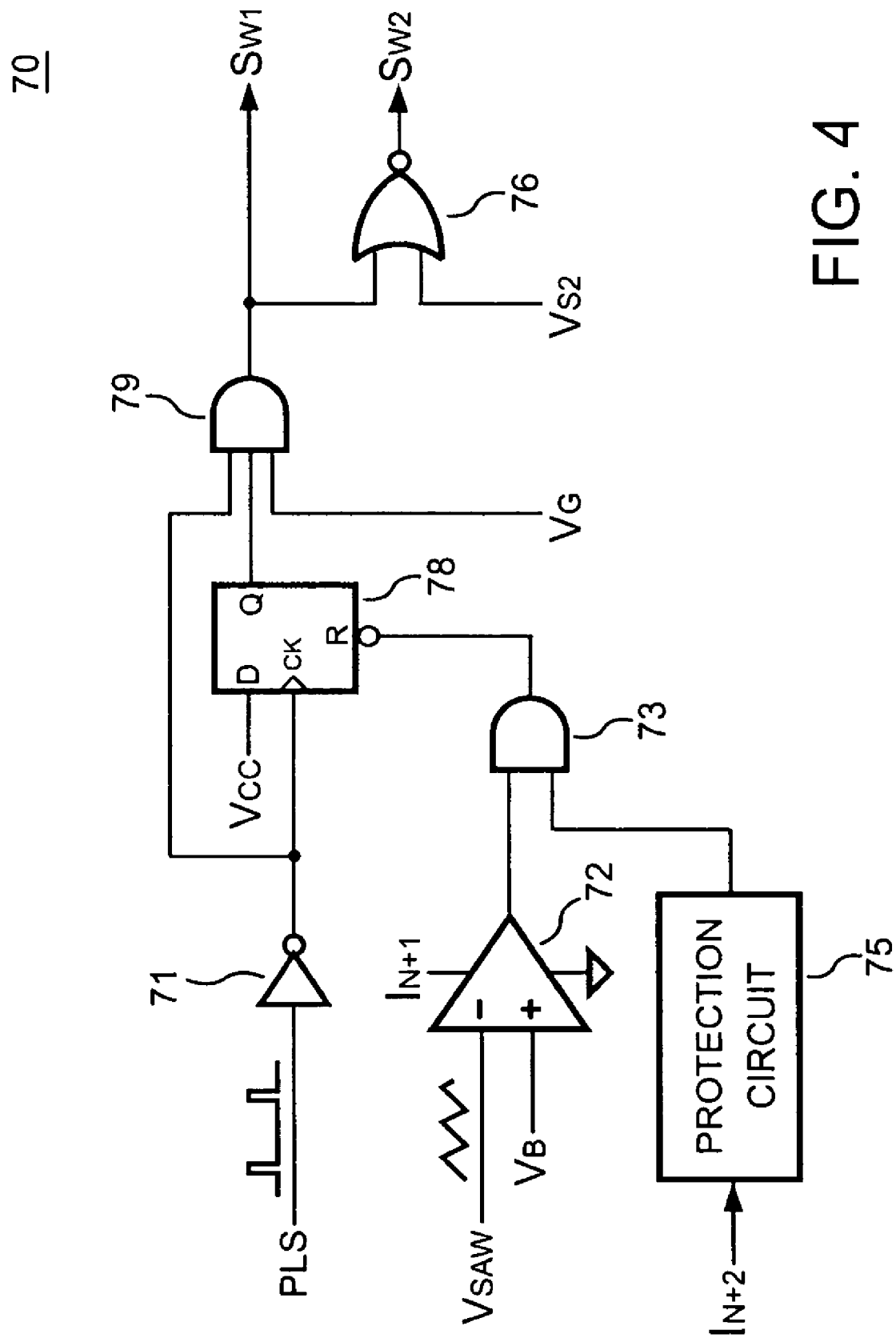
FIG. 4 shows an embodiment of a second control unit according to the present invention shown in FIG. 2.

FIG. 4 shows a preferred embodiment of the second control unit 70 according to the present invention. An input of the flip-flop 78 is supplied with a supply voltage $V_{CC}$. The oscillation signal PLS is supplied to a clock input of the flip-flop 78 through an inverter 71. The inputs of an AND gate 79 are respectively coupled to an output of the flip-flop 78, an output of the inverter 71 and the energy saving signal $V_G$. An output of the AND gate 79 generates the switching signal $S_{W1}$. The switching signal $S_{W1}$ is thus enabled in response to a falling edge of the oscillation signal PLS. The switching signal $S_{W1}$ is disabled whenever the oscillation signal PLS is enabled (high potential) and the energy saving signal $V_G$ is enabled (low potential). An input of an NOR gate 76 is coupled to the output of the AND gate 79 for outputting the auxiliary switching signal $S_{W2}$ at an output of the NOR gate 76. The phase of the auxiliary switching signal $S_{W2}$ is thus the inverse of the switching signal $S_{W1}$. Another input of the NOR gate 76 is coupled to the auxiliary control signal $V_{S2}$. The auxiliary switching signal $S_{W2}$ is turned off as the auxiliary control signal $V_{S2}$ is enabled (high potential) to reduce power loss and save energy. A comparator 72 has a negative input coupled to the saw-tooth signal $V_{SAW}$. A positive input of the comparator 72 is coupled to the feedback signal $V_B$ to achieve feedback loop control. An input of an AND gate 73 is coupled an output of the comparator 72, another input of the AND gate 73 is coupled to an output of a protection circuit 75. An output of the AND gate 73 is coupled to a reset input of the flip-flop 78. The protection circuit 75 has the functions of over-voltage, over-current, and over-temperature protections, which protect the switching regulator and peripheral circuits thereof. Therefore, the switching signal $S_{W1}$ can be turned off by the protection circuit 75 or the feedback signal $V_B$.

Further referring to FIG. 4, the bias current $I_{N+1}$ powers the comparator 72, and the bias current $I_{N+2}$ powers the protection circuit 75. Under light load and no load conditions, the energy saving signal $V_G$ is low to turn off the bias current $I_{N+1}$ and the bias current $I_{N+2}$ to disable the circuits, such as the comparator 72 and the protection circuit 75, which need not to work under light load conditions for reducing the power consumption and achieving energy saving.

Figure 5:
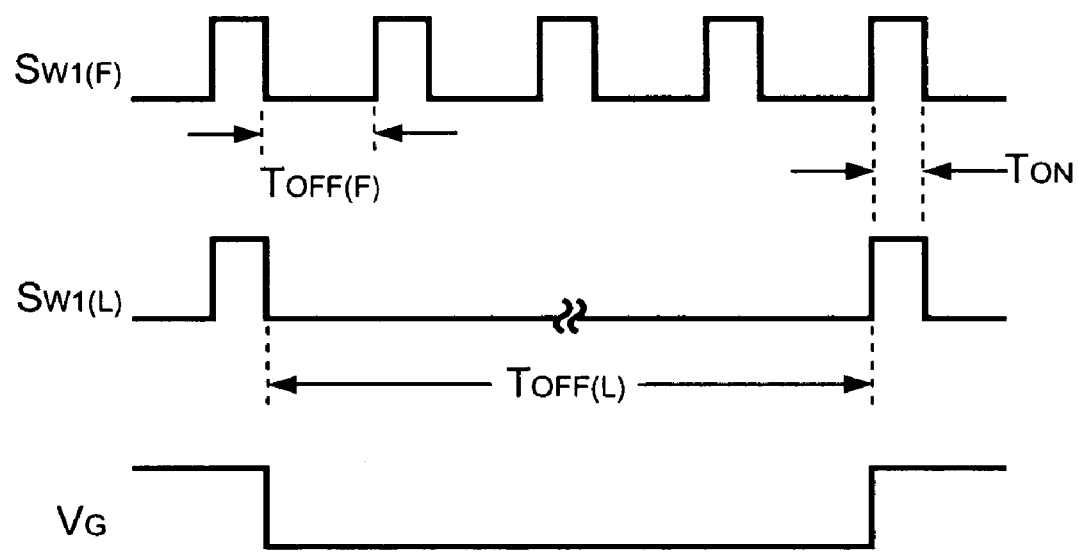
FIG. 5 shows waveforms of the switching signal and the energy saving signal according to the present invention shown in FIG. 2.

FIG. 5 shows waveforms of the switching signal $S_{W1}$ and the energy saving signal $V_G$ of the present invention. $S_{W1(F)}$ represents the switching signal under heavy-load conditions, and $S_{W1(L)}$ represents the switching signal under light-load conditions. The switching signal $S_{W1}$ is off as soon as the oscillation signal PLS is enabled (high potential) to provide a programmable off-time. $T_{OFF(F)}$ represents the off-time under heavy-load conditions, $T_{OFF(L)}$ represents the off-time under light-load conditions. A maximum of an on-time $T_{ON}$ of the switching signal $S_{W1}$ is fixed for preventing the magnetic components from saturation.

Figure 6:
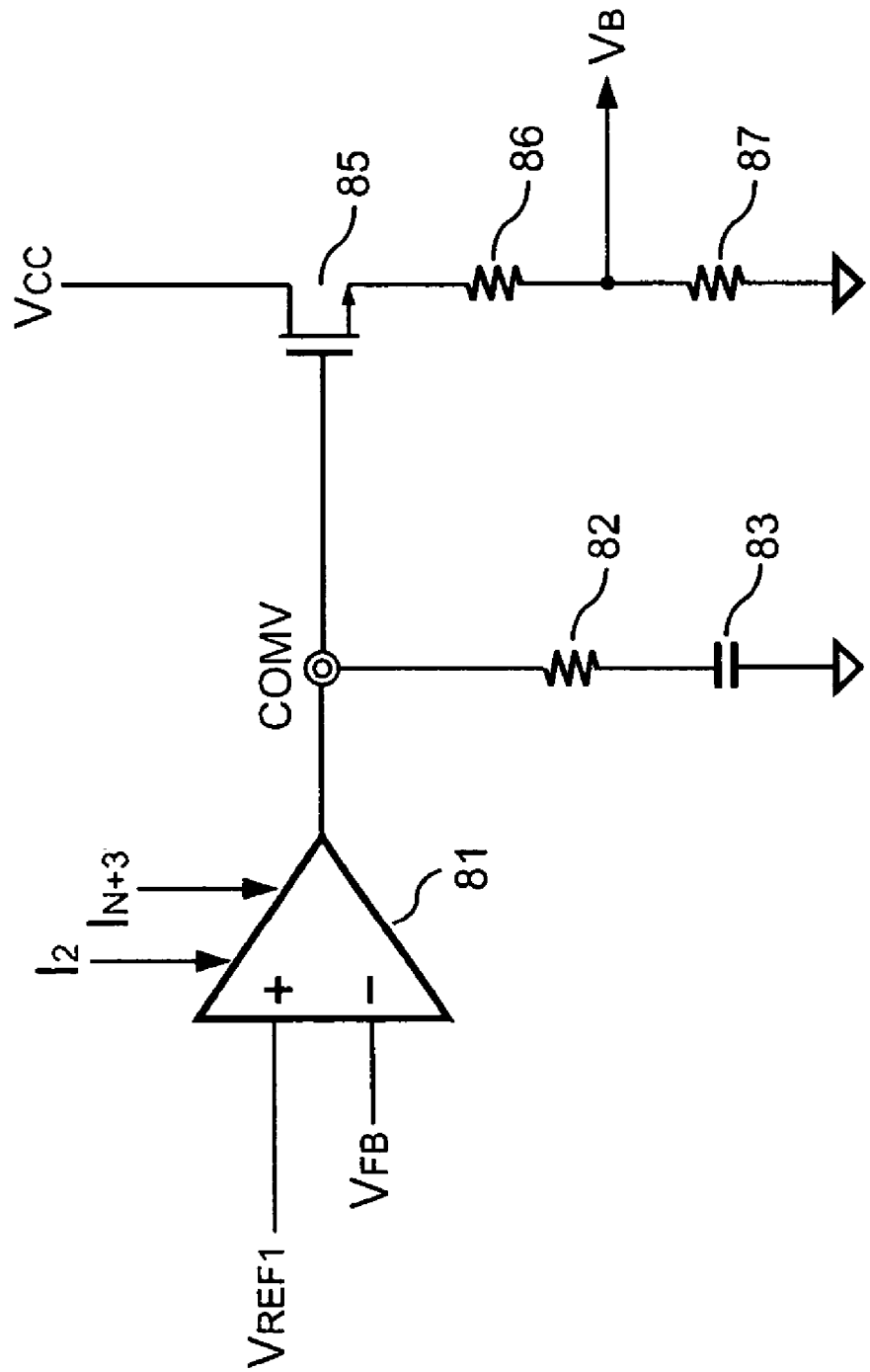
FIG. 6 shows an embodiment of a feedback unit according to the present invention shown in FIG. 2.

FIG. 6 shows an embodiment of the feedback unit 80 according to the present invention. The feedback unit 80 includes an error amplifier 81 which is a trans-conductance amplifier that has a positive input connected to the first reference voltage $V_{REF1}$, and a negative input connected to the outputting signal $V_{FB}$ of the coupler 50. A resistor 82 and a capacitor 83 are serially connected from an output COMV of the error amplifier 81 to a ground reference level for frequency compensation. A gate of a level-shift transistor 85 is coupled to the output COMV of the error amplifier 81. A source of the level-shift transistor 85 is coupled to an attenuator formed by a resistor 86 and a resistor 87 for outputting the feedback signal $V_B$. When the outputting signal $V_{FB}$ increases, the feedback signal $V_B$ is accordingly reduced. The error amplifier 81 is powered by the bias current $I_2$ and $I_{N+3}$. Under light load and no load conditions, the energy saving signal $V_G$ is low potential, and the bias current $I_{N+3}$ is cut off to save the power consumption of the error amplifier 81.

Figure 7:
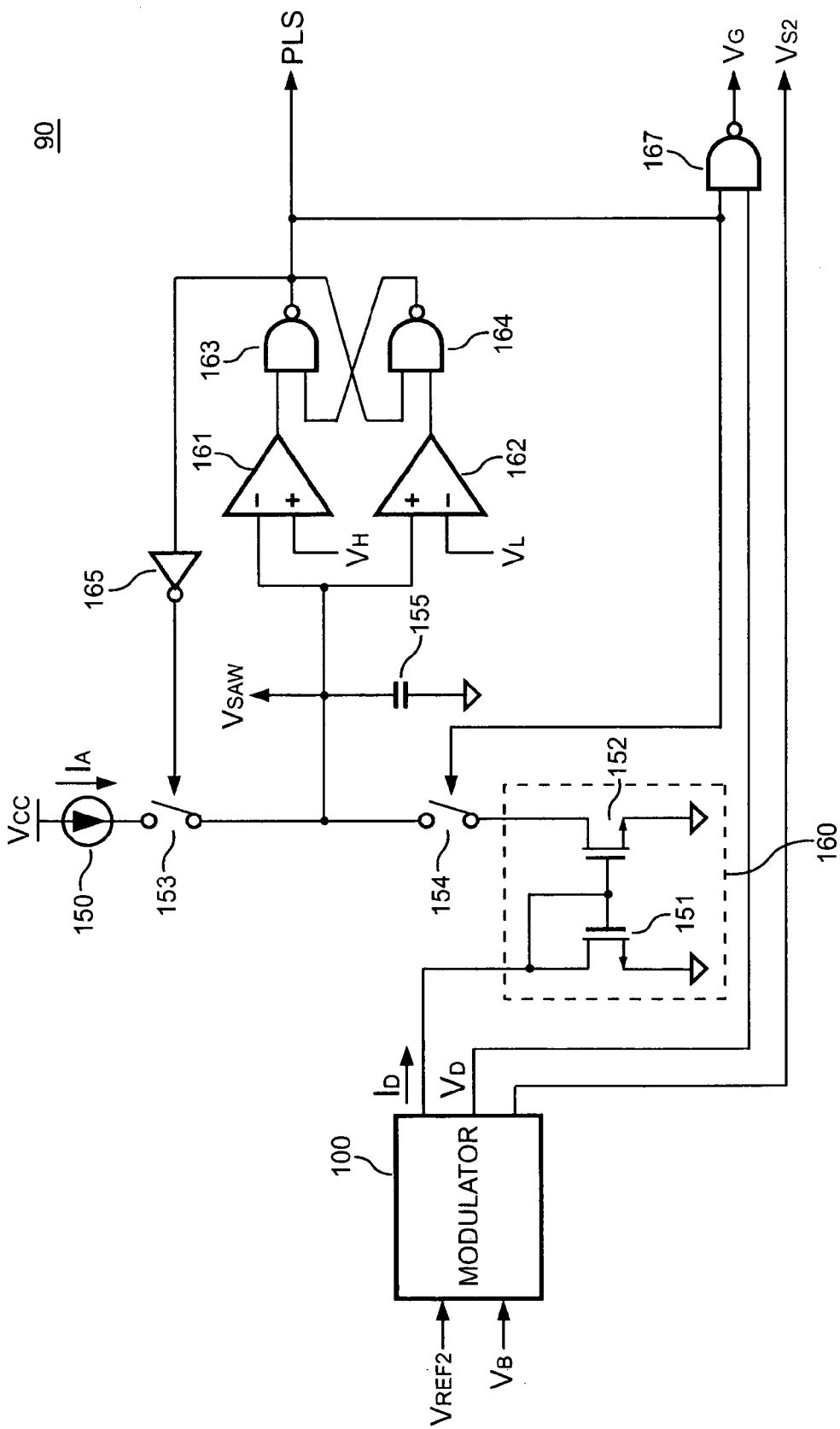
FIG. 7 shows an embodiment of a first control unit according to the present invention shown in FIG. 2.

In combination with FIG. 2, FIG. 7 is an embodiment of the first control unit 90 according to the present invention. The first control unit 90 comprises a modulator 100, an oscillation circuit, and an energy saving circuit. The modulator 100 receives the second reference voltage $V_{REF2}$ and the feedback signal $V_B$ to generate a discharge current $I_D$, a light-load signal $V_D$ and the auxiliary control signal $V_{S2}$. The oscillation circuit includes a charge current source 150, a switch 153, a switch 154, a capacitor 155, a discharge current source 160, and an oscillation control circuit to generate the oscillation signal PLS and the saw-tooth signal $V_{SAW}$. An energy saving circuit is implemented by a NAND gate 167, which is coupled to the oscillation signal PLS and the light-load signal $V_D$ to generate the energy saving signal $V_G$. A second current mirror circuit consisting of transistors 151 and 152 forms the discharge current source 160. The discharge current $I_D$ is coupled to an input of the second current mirror circuit. A switch 153 is coupled from the charge current source 150 to the capacitor 155. A switch 154 is coupled between the capacitor 155 and an output of the second current mirror circuit.

The oscillation control circuit includes a comparator 161, a comparator 162, a NAND gate 163, a NAND gate 164, and an inverter 165. The comparator 161 having a high threshold voltage $V_H$ and the comparator 162 having a low threshold voltage $V_L$ are coupled to the capacitor 155. The outputs of the comparators 161 and 162 are coupled to a latch circuit formed by NAND gates 163 and 164 to output the oscillation signal PLS. The oscillation signal PLS turns on/off the switch 154. An input of the inverter 165 is coupled to the oscillation signal PLS. An output of the inverter 165 turns on/off the switch 153 to achieve the oscillation. When the load reduces, the discharge current $I_D$ is decreased and the enable time of the oscillation signal PLS is therefore increased. The light-load signal $V_D$ is enabled once the load is lower than a threshold value. The energy saving signal $V_G$ is thus generated as the light-load signal $V_D$ and the oscillation signal PLS are enabled. A charge current $I_A$ provided by the charge current source 150 and a capacitance of the capacitor 155 determine a maximum on-time $T_{ON}$ of the switching signal $S_{W1}$. The discharge current $I_D$ and the capacitor 155 determine the off-time $T_{OFF}$ of the switching signal $S_{W1}$. The charge current $I_A$ is a constant current, and the discharge current $I_D$ is changed in direction proportion to the load variation.

Figure 8:
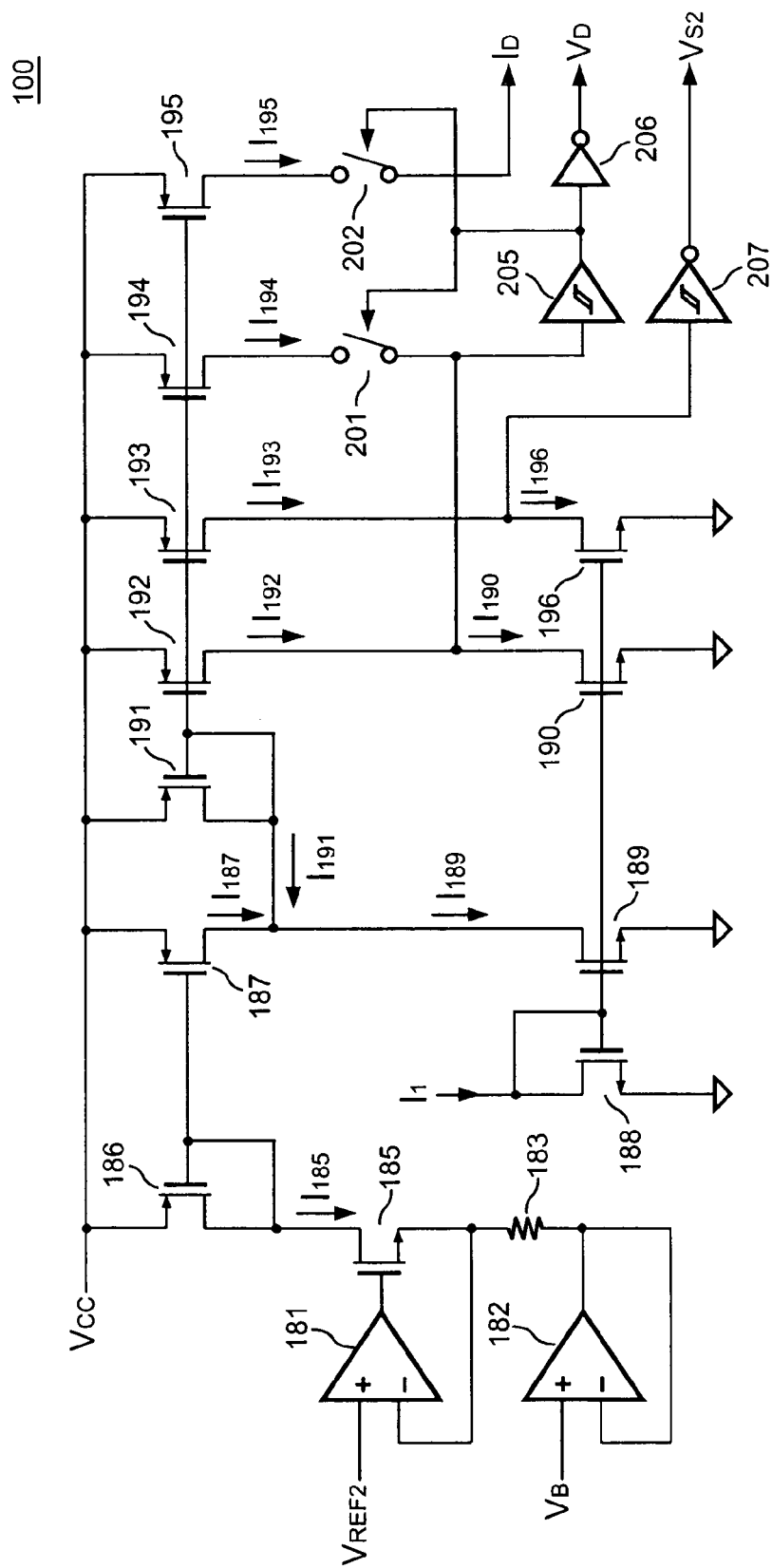
FIG. 8 is a schematic diagram of a modulator according to the present invention shown in FIG. 7.

FIG. 8 is a schematic diagram of the modulator 100 according to the present invention. The modulator 100 comprises an second V-to-I converter, a third current mirror circuit, a fourth current mirror circuit, a fifth current mirror circuit, a buffer 205, an inverting buffer 207, and an inverter 206. The second V-to-I converter is formed by a transistor 185, a resistor 183, an operational amplifier 181, and an operational amplifier 182. The operational amplifier 181 is coupled to the second reference voltage $V_{REF2}$. The operational amplifier 182 is coupled to the feedback signal $V_B$. The second V-to-I converter generates a current $I_{185}$. When the load decreases, the outputting signal $V_{FB}$ is increased and the feedback signal $V_B$ is thus reduced. Once the feedback signal $V_B$ is lower than the second reference voltage $V_{REF2}$, the current $I_{185}$ is increased in response to the decrement of the feedback signal $V_B$. The third current mirror circuit formed by transistors 186 and 187 receives the current $I_{185}$ to output a current $I_{187}$. A constant current source supplied by the bias current $I_1$ is coupled to an input of the fourth current mirror circuit formed by transistors 188, 189, 190 and 196 to respectively generate a current $I_{189}$, a current $I_{190}$ and a current $I_{196}$. The fifth current mirror circuit comprises transistors 191, 192, 193, 194 and 195. An input of the fifth current mirror circuit is coupled between a drain of the transistor 187 and a drain of the transistor 189 to draw a differential current $I_{191}$ of the current $I_{187}$ and the current $I_{189}$ for generating a current $I_{192}$ at a drain of the transistor 192, a current $I_{193}$ at a drain of the transistor 193, a current $I_{194}$ at a drain of the transistor 194, and a current $I_{195}$ at a drain of the transistor 195. The drain of the transistor 192 is coupled to the drain of the transistor 190. The drain of the transistor 193 is coupled to a drain of the transistor 196. An input of the inverting buffer 207 is coupled between the drain of the transistor 193 and the drain of the transistor 196. When the current $I_{192}$ is smaller than the current $I_{190}$, the voltage at an input of the buffer 205 is at low level. The inverter 206 receives the low level voltage and output a high level light-load signal $V_D$ for outputting a low level energy saving signal $V_G$ to turn off some circuits that need not to operate under light load to save energy. When the current $I_{193}$ is smaller than the current $I_{196}$, the voltage at an input of the inverting buffer 207 is at low level, an output of the inverting buffer 207 will thus generate the auxiliary control signal $V_{S2}$, thereby disabling the auxiliary switching signal $S_{W2}$ and switching off the auxiliary switch $Q_2$. A switch 201 is coupled between the drain of the transistor 194 and the input of the buffer 205. A switch 202 is coupled to the drain of the transistor 195 for providing the discharge current $I_D$. The discharge current $I_D$ is provided by the current $I_{195}$ as the switch 202 is turned on.

A buffer circuit 205 has an output for turning on/off the switches 201 and 202. The inverter 206 is coupled to the output of the buffer circuit 205 to output the light load signal $V_D$. The threshold level of the light-load signal $V_D$ is adjustable and applied to avoid the acoustic noise. The discharge current $I_D$ determines the switching frequency of the switching signal $S_{W1}$. If the switching frequency of the switching signal $S_{W1}$ falls into the audio band, the switch 202 would be turned off to disable the discharge current $I_D$ and the switching signal $S_{W1}$ for eliminating the acoustic noise. The switch 202 can be turned on by the feedback signal $V_B$ to enable the discharge current $I_D$ once the load increases and the switching frequency of the switching signal $S_{W1}$ is higher than the audio band.

According to an embodiment of the present invention, an energy saving control method of the switching regulator includes the following steps.

the switching regulator performs an energy saving control method including:

detecting the load variation of the switching regulator, referring to the feedback unit 80 shown in FIG. 2 and FIG. 6, the feedback unit 80 is coupled to the load of the switching regulator and generates the feedback signal $V_B$ in response to the load variation;

using the feedback signal $V_B$ to determine the light load condition, referring to the first control unit 90 shown in FIG. 2 and FIG. 7, the first control unit 90 receives the feedback signal $V_B$ and generates the light-load signal $V_D$ and the oscillation signal PLS in response to the feedback signal $V_B$; the enable time of the oscillation signal PLS is increased with the load decrement; and the light-load signal $V_D$ and the oscillation signal PLS determine to enable the energy saving signal $V_G$;

generating the switching signal $S_{W1}$ based on the feedback signal $V_B$ to control a power delivered to the load of the switching regulator, referring to the second control unit 70 shown in FIG. 2 and FIG. 4, the second control unit 70 receives the oscillation signal PLS and the energy saving signal $V_G$ to determine the duty cycle of the switching signal $S_{W1}$; the oscillation signal PLS determines the off-time of the switching signal $S_{W1}$; and the maximum on-time of the switching signal $S_{W1}$ is kept fixed; and using the energy saving signal $V_G$ to cut off the power for parts of circuits of the switching regulator under light load conditions during the off-time of the switching signal $S_{W1}$.

What is claimed is:

1. A switching regulator, comprising:
   a switch, coupled to an input of said switching regulator to control power delivery to an output of said switching regulator; wherein a load is coupled to said output of said switching regulator;
   a feedback circuit, coupled to said output of said switching regulator to output a feedback signal in response to conditions of said load;
   a first control unit, for receiving said feedback signal and outputting an oscillation signal and an energy saving signal, wherein an off-time of said oscillation signal and said energy saving signal increases in response to said feedback signal; and a second control unit, for receiving said feedback signal and said oscillation signal and outputting a switching signal to control said switch, wherein a maximum on-time of said switching signal is fixed for preventing magnetic elements from saturation, wherein said first control unit comprises:

a modulator, for receiving said feedback signal to output a discharge current and a light-load signal;

an oscillation circuit, including a charge current source, a discharge current source, a charge switch, a discharge switch, a capacitor and an oscillation control circuit to generate said oscillation signal, wherein said discharge current source mirrors said discharge current for discharging said capacitor; and an energy saving circuit, receiving said oscillation signal and said light-load signal to output said energy saving signal, wherein said discharge current decreases as said load decreases, an enable time of said oscillation signal is increased as said discharge current decreases, said light-load signal is enabled once said load is lower than a threshold value, and said energy saving signal is outputted by said energy saving circuit as said light-load signal and said oscillation signal are enabled, wherein said modulator comprises:

a first operational amplifier, for receiving said feedback signal;

a second operational amplifier, coupled to a threshold voltage;

a V-to-I converter, formed by a transistor, a resistor, said first operational amplifier and said second operational amplifier for outputting a first current, said first current being increased in response to a decrement of said feedback signal once said feedback signal being lower than said threshold voltage;

a first current mirror circuit, receiving said first current to output a second current;

a constant current source;

a second current mirror circuit, coupled to said constant current source to generate a third current and a fourth current;

a third current mirror circuit, coupled to said first current mirror circuit and said second current mirror circuit, said third current mirror circuit receiving a differential current of said second current and said third current for outputting a fifth current, a sixth current and a seventh current;

a first switch, having a first terminal supplied with said sixth current;

a second switch, having a first terminal supplied with said seventh current and a second terminal for outputting said discharge current;

a buffer circuit, having an input terminal for receiving a differential current of said fifth current and said fourth current and for coupling to a second terminal of said first switch, an output terminal of said buffer circuit being coupled to control terminals of said first switch and said second switch for turning on/off said first switch and said second switch; and an inverter, coupled to said output terminal of said buffer circuit to output said light-load signal.

2. The switching regulator as claimed in claim 1, wherein said switching signal is disabled before a switching frequency of said switching signal falls into an audio band to eliminate acoustic noises, said switching signal is enabled by said feedback signal when said load increases and said switching frequency of said switching signal is higher than the audio band.

3. The switching regulator as claimed in claim 1, wherein said switching signal is disabled as said oscillation signal is enabled; a programmable off-time of said switching signal varying in response to a variation of said load.

4. The switching regulator as claimed in claim 1, further comprising an auxiliary switch coupled to said switch.

5. The switching regulator as claimed in claim 4, wherein said first control unit outputs an auxiliary control signal, and as said off-time of said switching signal increases in response to a decrease of said load, said auxiliary control signal is used to turn off said auxiliary switch.

6. The switching regular as claimed in claim 1, wherein said switching regulator is a buck converter, a flyback converter, or a half-bridge power supply topology.

* * * * *